O. H. S. BRUMFIELD.
Grain-Drill.
No. 21,316. Patented Aug. 31, 1858.
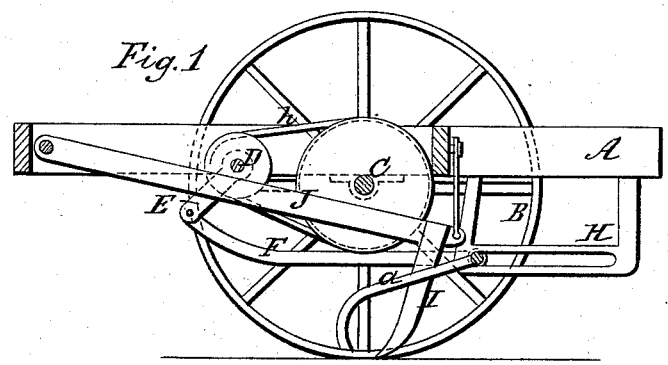
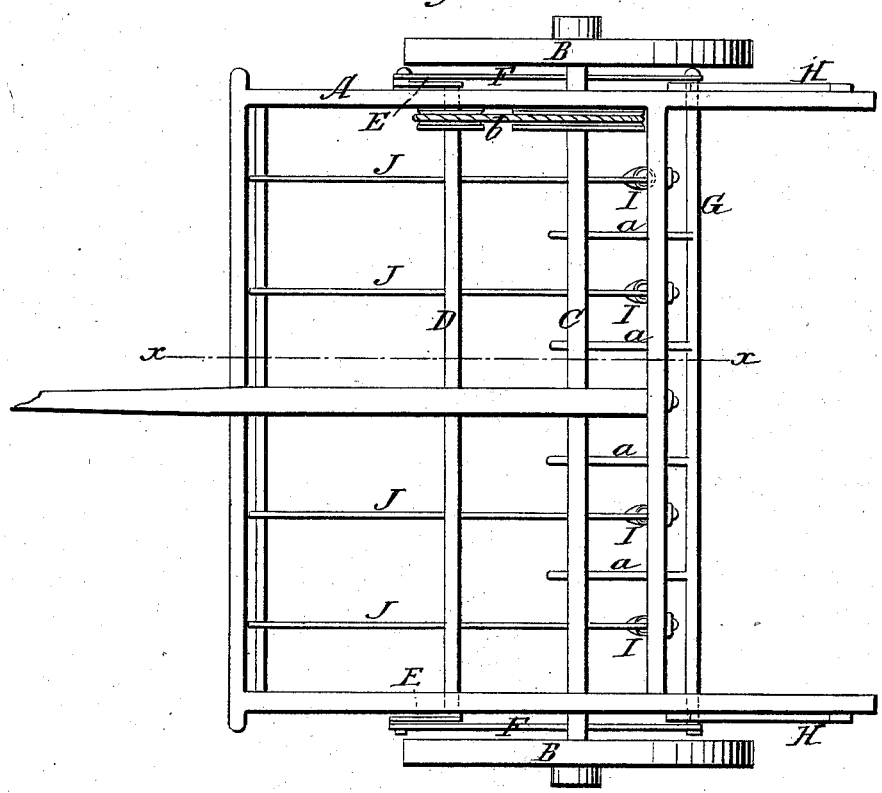

UNITED STATES PATENT OFFICE.

O. H. S. BRUMFIELD, OF CENTREVILLE, INDIANA.

IMPROVEMENT IN SEED-DRILLS.

Specification forming part of Letters Patent No. 21,316, dated August 31, 1858.

*To all whom it may concern:*

Be it known that I, O. H. S. BRUMFIELD, of Centreville, in the county of Wayne and State of Indiana, have invented a new and Improved clearing attachment to be applied to seed-drills for the purpose of removing loose weeds, grass, and all trash that may lie in the paths of the drill-teeth; and I do hereby declare that the following is a full, clear, and exact description of the same, reference being had to the annexed drawings, making part of this specification, in which—

Figure 1 is a side sectional view of my invention, taken in the line x x, Fig. 2. Fig. 2 is a plan or top view of the same.

Similar letters of reference indicate corresponding parts in the two figures.

This invention consists in having a series of hooks or curved teeth attached to a rod, the ends of which are fitted in horizontal guides and connected to pitmen which are attached to cranks, the parts being arranged, as hereinafter described, so that the surface of the ground in front of the drill-teeth will, as the machine is drawn along, have all obstructions removed, and the drill-teeth thereby prevented from becoming choked or clogged.

To enable those skilled in the art to fully understand and construct my invention, I will proceed to describe it.

A represents a horizontal frame, which is mounted on two wheels, B B, said wheels being permanently attached to their axle C, which is fitted in suitable bearings at the under side of frame A. In the frame A, in front of the axle C, and parallel with it, a shaft, D, is placed. This shaft has a crank, E, at each end of it, said cranks being at the outer sides of the frame A. To the end of each crank E a curved pitman, F, is attached, and the back ends of these pitmen are secured to the ends of a rod, G, which work in horizontal guides H H, attached one to each side of the frame A at its back part. One guide, H, is shown plainly in Fig. 1. The rod G has a series of curved teeth, a, attached to it, the form of which is clearly shown in Fig. 1. These teeth are placed between the hollow drill-teeth I, as shown clearly in Fig. 2. The drill-teeth I are attached to bars J, and arranged in the usual way. The crank-shaft D is driven from the axle C by means of a belt, b; or gearing may, if desired, be used for such purpose.

The operation will be readily seen. As the machine is drawn along the cranks E and pitman F give a reciprocating movement to the rod G and teeth a, and, besides the reciprocating movement, the teeth a have a rising-and-falling movement, the front ends of the teeth rising clear of the ground as they are shoved forward, and falling so as to reach or come in contact with the ground and rake back all trash from before the drill-teeth I, so that the same will not become choked or clogged thereby.

I am aware that revolving teeth or arms have been used for clearers and applied to seeding-machines. I am also aware that cutters and reciprocating bars have been employed for a similar purpose; but I am not aware that teeth arranged to operate as herein shown have been used for the purpose mentioned. I do not claim, therefore, broadly the use of teeth, irrespective of the arrangement, adaptation, and mode of operation as shown; but

I claim as new and desire to secure by Letters Patent—

The teeth a, attached to the rod G, and placed between the drill-teeth I when said rod is operated by the pitman F and cranks E, so that the teeth a will have the reciprocating and rising-and-falling movement communicated to them, as and for the purpose set forth.

O. H. S. BRUMFIELD.

Witnesses:
MOSES ROBBINS,
G. W. B. SMITH.